United States Patent [19]
Smith

[11] Patent Number: 6,050,577
[45] Date of Patent: Apr. 18, 2000

[54] MANUAL TRANSPORT VEHICLE

[76] Inventor: Randall B. Smith, 11223 SW. Tualatin-Sherwood Hwy., Tualatin, Oreg. 97062

[21] Appl. No.: 08/745,600

[22] Filed: Nov. 8, 1996

[51] Int. Cl.$^7$ ..................................................... B62B 1/14
[52] U.S. Cl. .................................. 280/47.24; 280/47.29; 280/655
[58] Field of Search .............................. 280/35, 638, 659, 280/655, 47.131, 47.16, 47.17, 47.18, 47.19, 47.24, 47.26, 47.29, 47.33, 47.31; 414/24.5, 111, 490, 469; 16/115; 224/548, 553; 242/557

[56] References Cited

U.S. PATENT DOCUMENTS

| | | | |
|---|---|---|---|
| 736,878 | 8/1903 | Reis | 56/400.04 |
| 1,763,757 | 6/1930 | Charles | 222/619 |
| 2,544,861 | 3/1951 | Rath | 56/400.14 |
| 2,638,730 | 5/1953 | Davidson | 56/400.14 |
| 2,814,402 | 11/1957 | Schaefer | 414/457 |
| 3,045,847 | 7/1962 | Fisher | 280/47.31 |
| 3,647,238 | 3/1972 | Mackey | 280/47.17 |
| 3,661,414 | 5/1972 | Roth | 294/59 |
| 3,937,414 | 2/1976 | Bank et al. | 280/47.19 |
| 4,121,855 | 10/1978 | Mortenson | 280/47.29 |
| 4,358,123 | 11/1982 | Richards | 280/47.131 |
| 4,566,708 | 1/1986 | Specie | 280/47.131 |
| 4,793,623 | 12/1988 | Talbot | 280/47.24 |
| 4,957,306 | 9/1990 | Greenberg | 280/47.24 |
| 5,149,116 | 9/1992 | Donze et al. | 280/47.31 |
| 5,235,799 | 8/1993 | Quesnelle et al. | 56/400.04 |
| 5,249,821 | 10/1993 | Ricketts et al. | 280/638 |
| 5,465,987 | 11/1995 | DellaVecchia | 280/47.18 |
| 5,474,313 | 12/1995 | Marquardt | 280/47.28 |
| 5,500,981 | 3/1996 | Ho | 280/655 |
| 5,603,597 | 2/1997 | Clay, Sr. | 414/24.5 |
| 5,678,843 | 10/1997 | Liu | 280/655 |

FOREIGN PATENT DOCUMENTS

| | | | |
|---|---|---|---|
| 2244469 | 12/1991 | United Kingdom | 414/24.5 |

*Primary Examiner*—J. J. Swann
*Assistant Examiner*—Frank Vanaman
*Attorney, Agent, or Firm*—Kolisch, Hartwell, Dickinson, McCormack & Heuser

[57] ABSTRACT

A manual transportation vehicle is provided for use in transporting baled material. The vehicle consists of a frame, which includes a ground-travel-transport mechanism and a handle portion, and plural elongate tines pivotally mounted on the frame. The tines may be selectively pivoted within a span bounded by an upper orientation, where the tines rest against the frame, and a lower orientation defined by an adjustable stop on the frame. A lever is operatively coupled to the frame for adjusting the radial orientation of the tines within the span bounded by the upper orientation and the lower orientation. In a variation of this embodiment, the frame includes a support structure for supporting baled material rearward of the ground-travel-transport mechanism.

15 Claims, 7 Drawing Sheets

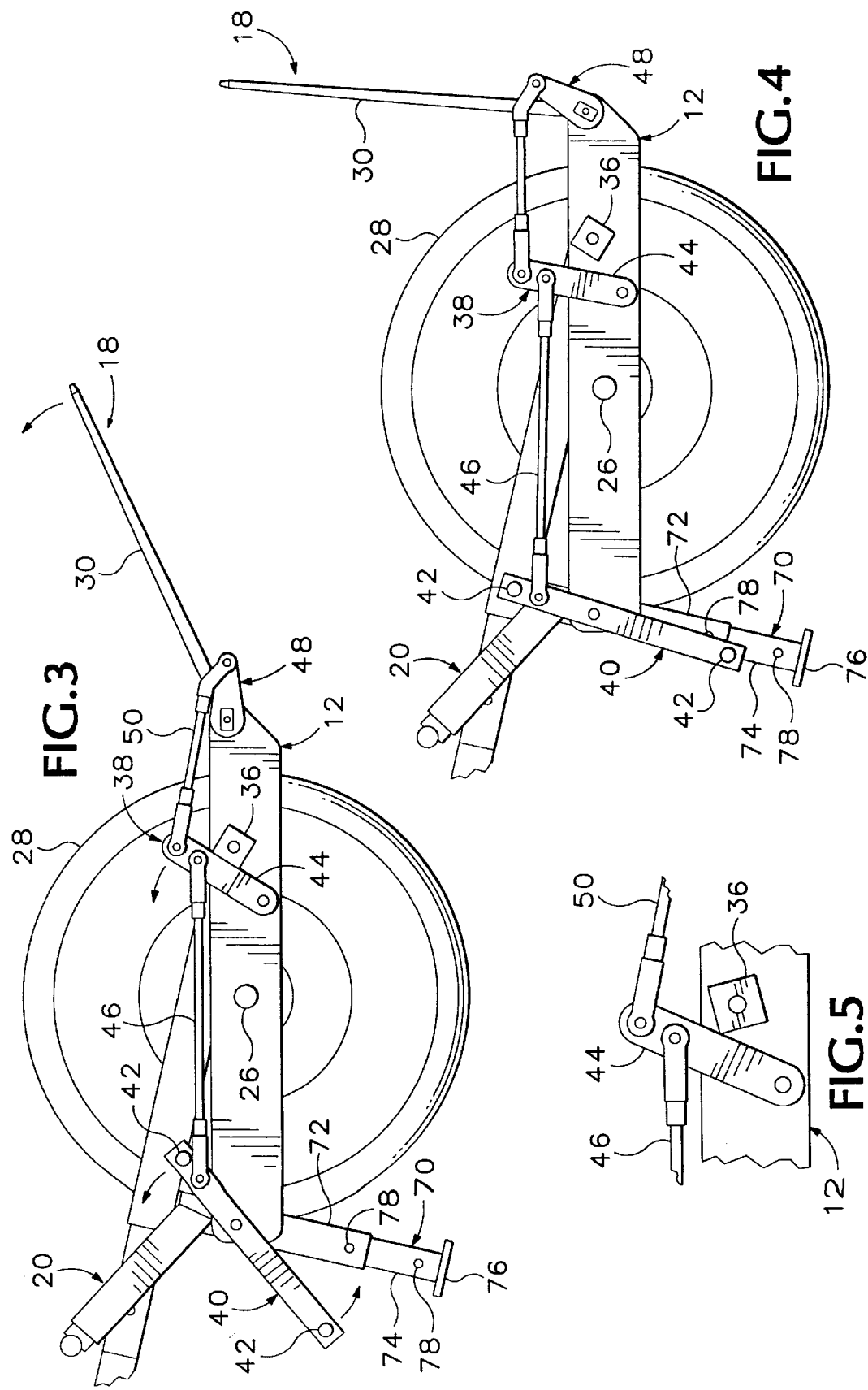

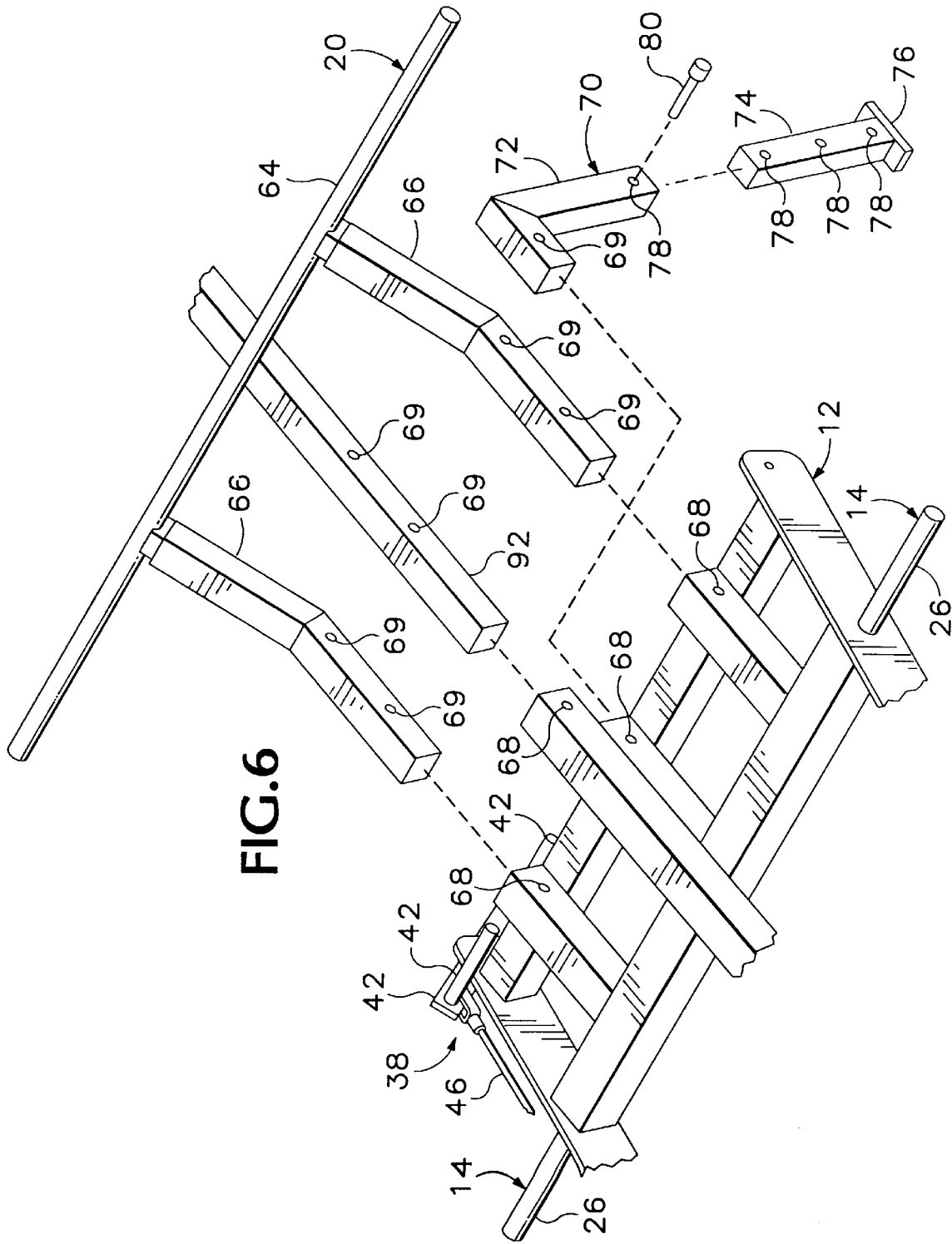

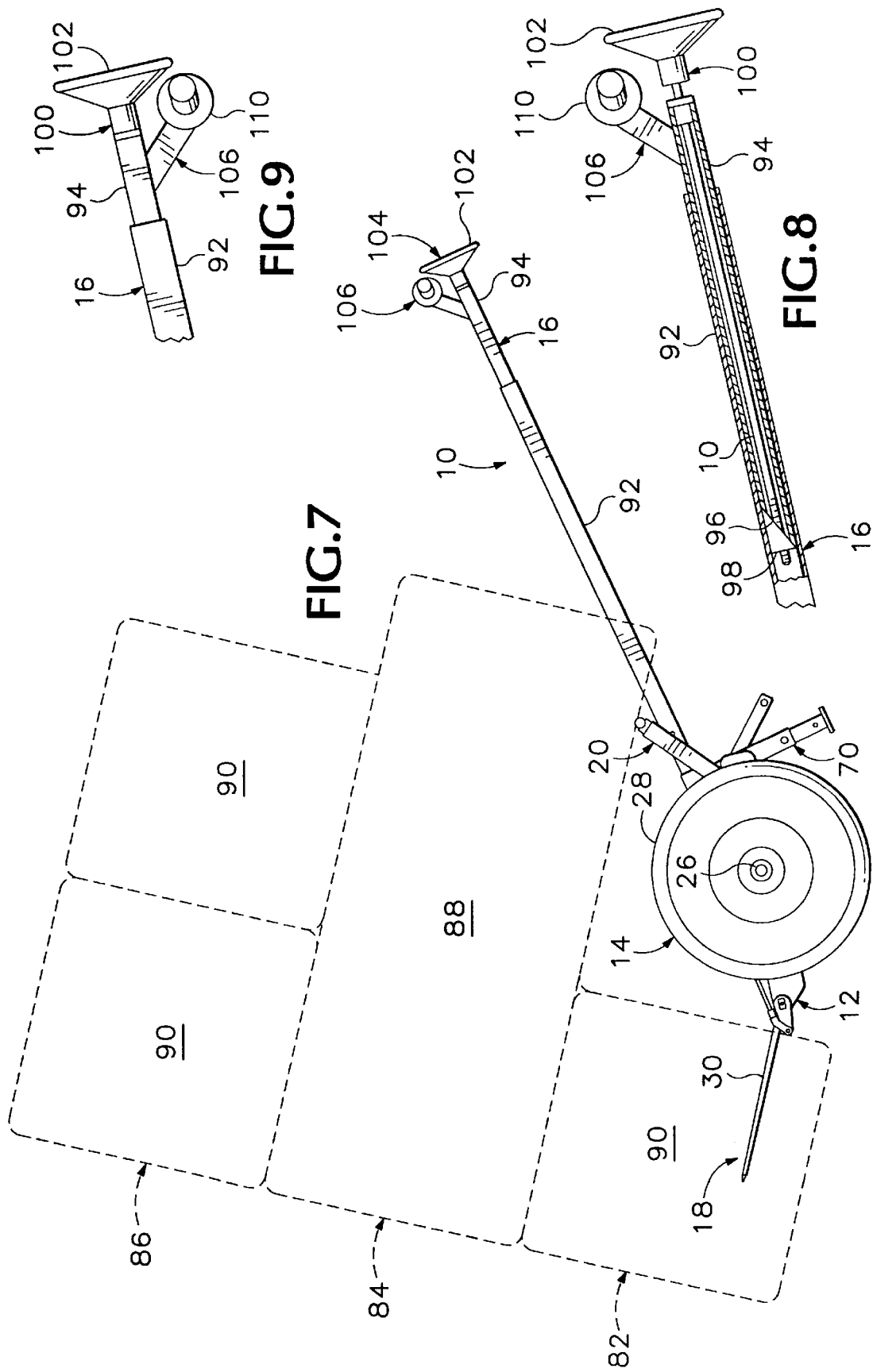

MANUAL TRANSPORT VEHICLE

TECHNICAL FIELD

The present invention relates generally to vehicles for transporting material, and more particularly, to a manual transport vehicle for transporting baled material.

BACKGROUND ART

In the agricultural industry, it is often necessary to transport baled material for use in feeding livestock, controlling erosion or any of a number of other barnyard tasks. These bales typically are of a material such as hay, cotton or straw, and generally include a substantial mass of material, often weighing 50-pounds to well over 100-pounds. The material typically is bound by wire or another suitable strapping material, which also may serve as a handhold for picking up the bale. Accordingly, transport of baled material typically is effected by hand.

It is known, however, to use trailers or other wheeled vehicles which may be towed from one place to another without the back-breaking labor required when hand-carrying these bales. Unfortunately, these trailers typically are heavy, are difficult to transport, and may be cumbersome to use in a confined space such as a barn. Furthermore, it is often still necessary to hand-carry bales from the trailer to their final destination. What is needed is a transport vehicle which is more particularly adapted for carrying baled material.

DISCLOSURE OF THE INVENTION

To address the aforementioned problems, a manual transport vehicle is provided for use in transporting baled material without the need for a cumbersome trailer or the like. The vehicle includes a frame with a forward support structure having plural elongate tines which are pivotally mounted on the frame for piercing and extending at least partially through baled material to be transported. The tines typically are spaced along the frame and are selectively pivotable within a predetermined span. In the preferred embodiment, a lever is operatively coupled to the fines for adjusting the radial orientation of the tines within this span. The span is defined between an upper orientation where the tines rest against the frame and a lower orientation where the tines extend outwardly so as to provide for piercing of a bale of material to be transported by the vehicle.

The transport vehicle typically is wheeled, and is readily disassembled to accommodate storage of the vehicle when it is not in use. In the preferred embodiment, the frame also includes both a forward support structure and a rearward support structure. The forward support structure includes tines mounted forward of the vehicle's wheels. The rearward support structure includes an elongate member extending transverse to the frame and mounted rearward of the wheels. Together, the forward support structure and rearward support structure provide and allow the user to balance a load on opposite sides of the wheels. A handle extends rearward of the wheels to provide a steering mechanism for the vehicle. The handle preferably is telescoping, having an outer concentric element, an inner concentric with an oblique terminal portion which extends at least partially within the outer concentric element, and a block disposed within the outer concentric element adjacent the terminal portion of the inner concentric element. Accordingly, the handle typically employs a mechanism for drawing the block into slidable engagement with the terminal portion to effect transverse displacement between the block and the terminal portion.

The frame also may be configured to receive a variety of selectively removable attachments which may be supported on the frame when the tines are in the upper orientation. The attachment enables the vehicle to be used to transport objects other than baled material and may include a broom structure, a bobbin-supporting structure, a storage structure and/or a wagon structure.

These and additional objects and advantages of the present invention will be more readily understood after a consideration of the drawings and the detailed description of the preferred embodiment.

BRIEF DESCRIPTION OF THE DRAWINGS

FIG. 3 is an enlarged, fragmentary left-side view of the manual transport vehicle of FIG. 1, the tines of the vehicle's forward support structure being pivoted to a lower orientation.

FIG. 4 is a fragmentary left-side view similar to that of FIG. 3, but with the tines pivoted to an intermediate orientation between upper and lower orientations thereof.

FIG. 5 is a further enlarged and fragmented left-side view of the manual transport vehicle of FIG. 1, such view illustrating operation of a stop which defines the lower orientation of the tines and a portion of a lever which is operatively coupled to the frame for adjusting the radial orientation of the tines.

FIG. 6 is a fragmentary, partially-exploded isometric view of the frame of the manual transport vehicle of FIG. 1.

FIG. 7 is a side view of the manual transport vehicle of FIG. 1, the depicted vehicle being configured to carry a balanced load of baled material as shown in dashed lines.

FIG. 8 is a fragmentary right-side view of a handle which forms a part of the frame of the manual transport vehicle shown in FIG. 1.

FIG. 9 is a fragmentary right-side view of the handle shown in FIG. 8, but in an alternative configuration.

Figure 1:
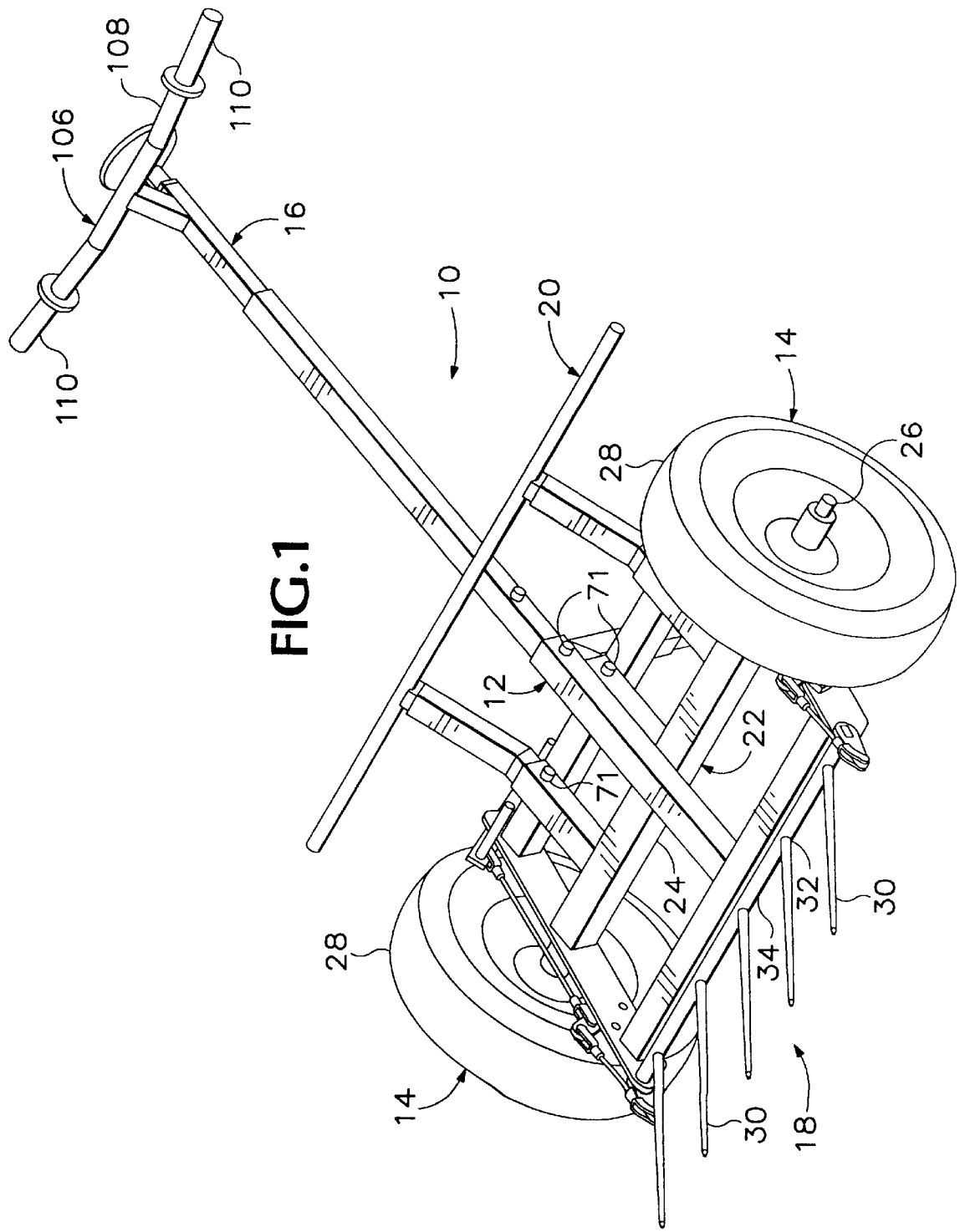
FIG. 1 is an isometric view showing a manual transport vehicle constructed in accordance with a preferred embodiment of the invention.

DETAILED DESCRIPTION OF THE PREFERRED EMBODIMENT AND BEST MODE FOR CARRYING OUT THE INVENTION

A manual transport vehicle constructed in accordance with a preferred embodiment of the invention is shown in the drawings and is indicated generally at 10. The depicted vehicle, which is used to transport baled material, includes a frame 12 having a ground-travel-transport mechanism 14, a handle portion 16, a forward support structure 18, and a rearward support structure 20.

Figure 2:
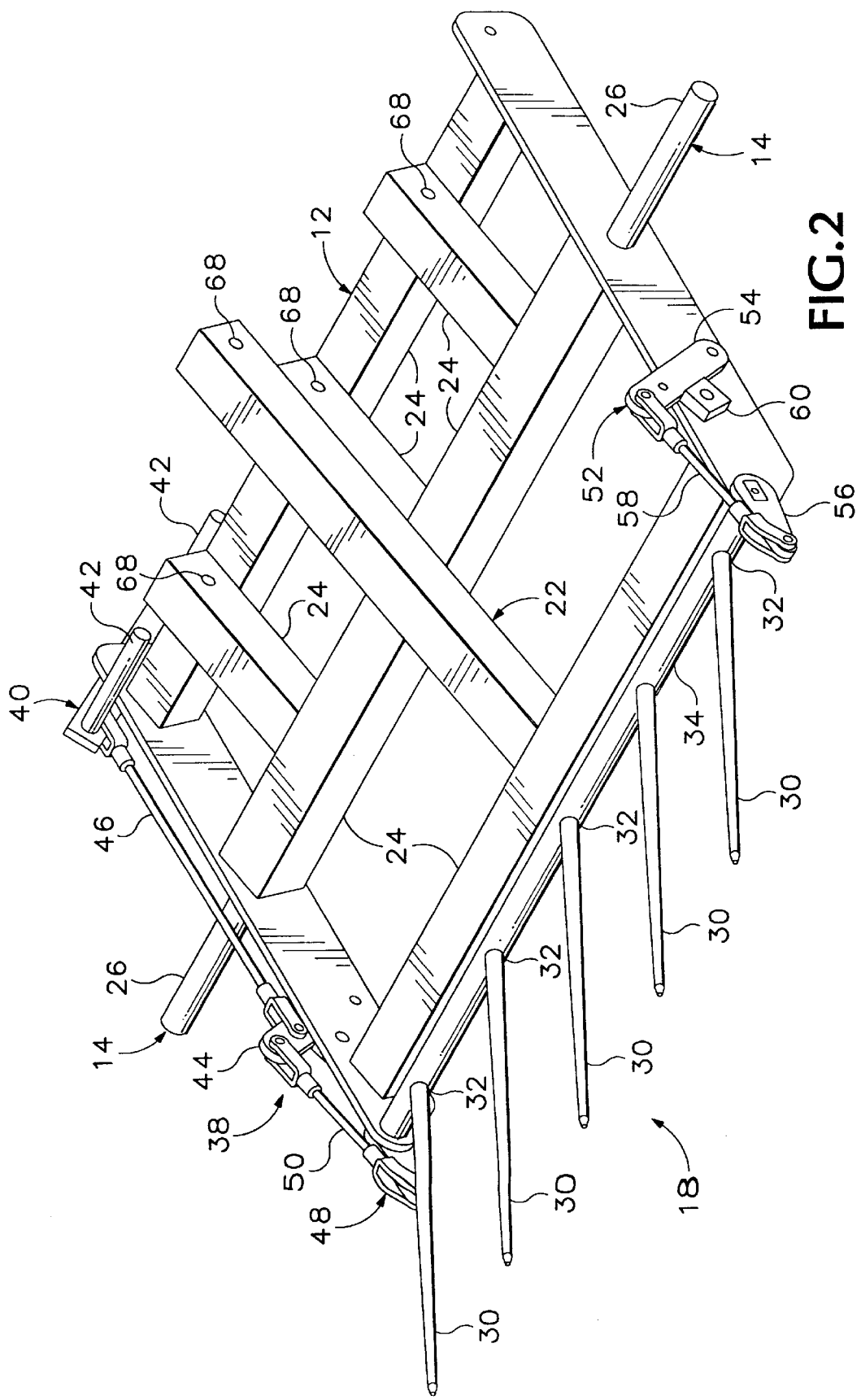
FIG. 2 is an enlarged isometric view of a frame and associated tines which form a part of the manual transport vehicle shown in FIG. 1.

Referring initially to FIGS. 1 and 2, it will be noted that the frame includes a body portion 22 which employs a framework of interconnected beams 24. In the depicted embodiment, the body portion has a generally planar configuration, but other configurations certainly are possible. For example, the body portion could form an arc, an angle or any other configuration capable of providing structure to frame 12. In fact, the body portion could employ a generally sheet-like expanse instead of, or in addition to, the previously described framework of beams. However, the frame preferably is constructed of steel or another suitably sturdy material.

As indicated in FIG. 1, ground-travel-transport mechanism 14 takes the form of a wheel mechanism which includes an axle 26 and a pair of wheels 28. In the preferred embodiment, the axle extends outwardly from both sides of the frame, one wheel being mounted on each side of the axle. The wheels may be of any suitable size and style, but typically must be capable of supporting loads of several hundred pounds. It also should be noted that other embodiments of the ground-travel-transport mechanism are possible including, for example, skids or skis such as those used on a sleigh. Furthermore, the wheels may employ various traction devices (not shown) depending on the ground surface and conditions in which the vehicle is to be used.

Focusing now on forward support structure 18, it is again noted that such structure includes plural elongate tines 30. As indicated, the tines are mounted on the frame typically in a configuration whereby they are arranged to selectively pierce baled material which is to be transported. The tines should be of suitable length to extend into the baled material such that the baled material is firmly engaged at all times during transportation. To accomplish this, the tines preferably have lengths within a range of between 4-inches and 18-inches. It is noted, however, that lengths outside of this range certainly are possible. In addition, the tines are constructed of a durable material (e.g., steel) which is capable of repeatedly undergoing the stresses involved in supporting the baled material. The tines typically each include a base 32 which is removably mounted on a crossbar 34. The crossbar is pivotally mounted on the frame, typically forward of axle 26. The tines are selectively spaced along the crossbar, each tine having a generally circular cross section, and being tapered to a point in order to accommodate puncture of a bale which is to be transported.

As indicated, the tines are pivotally adjustable, typically within a span bounded by an upper orientation (FIG. 10) and a lower orientation (FIG. 1).

The upper orientation is defined by a configuration where the tines have been rotated so that they rest against the frame. The lower orientation is defined by an adjustable stop 36, which is discussed subsequently.

Referring now to FIGS. 2–4, the frame will be seen to include a lever mechanism 38, such mechanism being operatively coupled to the tines for use in adjusting the radial orientation of the tines with respect to the frame. With particular reference to FIGS. 3 and 4, the lever mechanism will be understood to employ a series of three interconnected members, each of which is mounted on the frame. One of such members takes the form of actuating member 40, which is pivotally mounted on the frame. A linkage member 44 and effecting member 48 also are pivotally mounted on the frame. The interconnected members are interconnected via first rod 46 and second rod 50, the first rod connecting the actuating member to the linkage member, and the second rod connecting the linkage member to the effecting member. In the preferred embodiment, the interconnected members are connected to the first and second rods by pins, bolts, rivets, or other suitable devices for establishing a pivotal connection between two objects. The effecting member is pivotally mounted on the frame proximate the tines, and is further connected to crossbar 34. A pair of user-manipulatable foot pedals 42 provide a user interface with actuating member 40.

Lever mechanism 38 operates in conjunction with adjustable stop 36, such stop being configured to define the lower orientation to which the tines may be pivoted. As shown in FIGS. 3–5, stop 36 includes a generally rectangular block which is mounted on the frame near linkage member 44. When the linkage member engages the stop, the tines are in the lower orientation. The stop 36 is pivotally adjustable, providing for selected adjustment of the span of between the upper and lower orientations of the tines. Specifically, by rotating stop 36, the point at which the linkage member engages the stop may be adjusted, thereby adjusting the lower orientation of the tines. Furthermore, it should be apparent that stop 36 could be located in a variety other orientations on the frame, including adjacent the actuating member or adjacent the effecting member, and could take other forms such as a detent or series of detents.

To adjust the radial orientation of the tines, a user rotates either of the user-manipulatable portions 42. For example, in FIG. 3 a portion of the manual transport vehicle is shown with the tines in the lower orientation. It will be noted that linkage member 44 is engaging stop 36, and thus that the tines cannot pivot any lower. To pivot the tines toward the upper orientation, a user simply rotates either of the user-manipulatable portions of the actuating member in a counter-clockwise direction, as indicated with arrows in FIG. 3. This causes actuating member 40 to pivot, and correspondingly causes linkage member 44 and effecting member 48 to pivot. Because the effecting member is secured to crossbar 34, pivot of the effecting member results in corresponding pivot of tines 30.

As shown in FIG. 2, the vehicle also may include a supplemental support assembly 52 which is opposite lever mechanism 38. The supplemental support assembly includes a linkage member 52 which is connected to an effecting member 54 by a rod 56. A stop 58 is adjustably mounted on the frame adjacent linkage member 52 in a similar orientation to that of stop 36. The supplemental support assembly supplements support of crossbar 34, and thereby provides additional stability to the load.

Because vehicle 10 is intended for use in transporting multiple bales of material, it will be noted that frame 12 includes a rearward support structure 20 for supporting baled material rearward of axle 26. Support structure 20 includes an elongate member 64 which extends transverse to the frame. Elongate member 64 is connected to the frame by a pair of inclined struts 66 which typically are adjustably received into the frame (FIG. 6). Together, the rearward support structure and forward support structure provide vehicle 10 with the ability to balance a load as will be described below.

FIG. 7 illustrates use of manual transport vehicle 10, the vehicle being used to transport multiple bales of material (which are indicated in dashed lines). As indicated, the tines puncture and extend at least partially through a first layer of baled material 82 in order to provide forward support for the load. A second layer of baled material 84 extends transverse to the first layer and is supported on the first layer and rearward support structure 62. A third layer of baled material 86 preferably extends parallel to the first layer and is supported on the second layer. The bales are of similar size, each having generally rectangular elongate sides 88 and generally square ends 90. As indicated, it is possible to provide for support of the bales by both the forward support structure and the rearward support structure, thereby allowing the user to balance the load on opposite sides of axle 26.

It should be understood that other embodiments of the support structure also are within the scope of the invention. For example, the support structure could take the form of an arcuate member extending from the frame to support baled material. Alternatively, the support structure simply could take the form of spaced elongate members which extend rearward from the frame.

The vehicle also may include a kickstand 70 which extends generally downwardly from the frame to support the vehicle in a selected resting orientation. The kickstand typically includes a first portion 72 which is removably mounted on the frame, and a second portion 74 which extends downward from the first portion, and terminates in an enlarged stabilizer 76. The stabilizer provides additional support and balance to the vehicle when it is in its resting orientation. It should be understood that the term "resting orientation" is meant to include all situations in which the stabilizer is in contact with the ground or another surface on which the vehicle is used. The kickstand preferably is adjustable, the first portion being slidably received by the second portion. The first and second portions define a corresponding set of alignment holes 78 through which a pin 80 is passed to lock the kickstand in place.

Focusing now on handle 16, it will be noted that the handle extends rearward of the wheels 28, preferably in telescoping fashion so as to provide improved adaptability to the vehicle. Accordingly, as best illustrated in FIG. 8, the handle portion includes an outer concentric element 92 which is adjustably connected to the frame, and an inner concentric element 94 which telescopes within outer concentric element 92. The inner concentric element has an oblique terminal portion 96 which at least partially extends within the outer concentric element. A block 98 is disposed within the outer concentric element adjacent the terminal portion of the inner concentric element.

A lock mechanism 100 is used to draw block 98 into engagement with oblique terminal portion 96. Thereafter, mechanism 100 causes sliding transverse displacement between block 98 and terminal portion 96. This transverse displacement pushes the block against the outer concentric element, and thereby locks the inner concentric element in a defined orientation relative to the outer concentric element. Mechanism 100 can be any suitable device which allows a user to selectively draw the block into, or release the block from, slidable engagement with the terminal portion of the inner concentric element. As shown in FIG. 8, the preferred lock mechanism includes a user-manipulatable rotatable disk 102 which is connected to the block by a threaded rod 104.

Handle 16 further includes a steering device 106 which enables a user to maneuver and control the vehicle. Referring briefly back to FIG. 1, it can be seen that steering device 106 includes a transverse elongate bar 108 which is mounted on the inner concentric element and includes grips 110 on each end of the bar.

In the preferred embodiment, inner concentric element 94, mechanism 100 and steering device 106 are collectively removable from outer concentric element 92 in order to provide for further adaptation of vehicle 10. As shown in FIG. 9, for example, the inner concentric element may be repositioned so that steering device 106 is in a different orientation relative to outer concentric element 92. This feature enables the steering device to be adjusted to accommodate users with different heights.

As discussed previously, the handle, rearward support structure and kickstand all are adjustably received by the frame. Accordingly, beams 24 typically are open-ended to provide for receipt of the handle, rearward support structure, and kickstand. Furthermore, each beam defines one or more alignment holes 68 whereby the handle, rearward support structure and kickstand may be secured to the beams. The outer concentric element 92 of the handle, struts 66 of the support structure and first portion 72 of the kickstand 70 all are at least partially received within the beams and include a third set of alignment holes 69 which correspond with the second set of alignment holes 68. Pins 71 or other suitable locking devices are passed through corresponding pairs of alignment holes so as to lock the outer concentric element, struts and kickstand first portion in place. Furthermore, by removing the pins, each of these members can be removed, thereby providing for rapid disassembly of the frame.

In accordance with one important feature of the invention, vehicle 10 may be thought of as a load-distributing vehicle for use in transporting baled material. As previously discussed, the forward support structure 18 supports the load forward of the axle, and the rearward support structure 20 supports the load rearward of the axle. As such, the baled material to be transported by the vehicle may be balanced so as to place the load substantially in equipoise. In essence, the rearward support structure effects counterbalance of baled material engaged by the forward support structure.

FIGS. 10–13 depict the previously described manual transport vehicle adapted to transport objects other than baled material. As shown, the frame is configured to receive a selectively removable attachment 120 which is operatively coupled to the frame for supporting objects. The selectively removable attachment 120 is retained on the frame 12 by any suitable method of removable mechanical attachment. The attachment 120 may be supported on the forward support structure, on the rearward support structure, or on both. The attachment 120 similarly could include structural members which have alignment holes and which are at least partially received into and retained on the frame in a similar fashion as the previously described with respect to struts 66.

Figure 10:
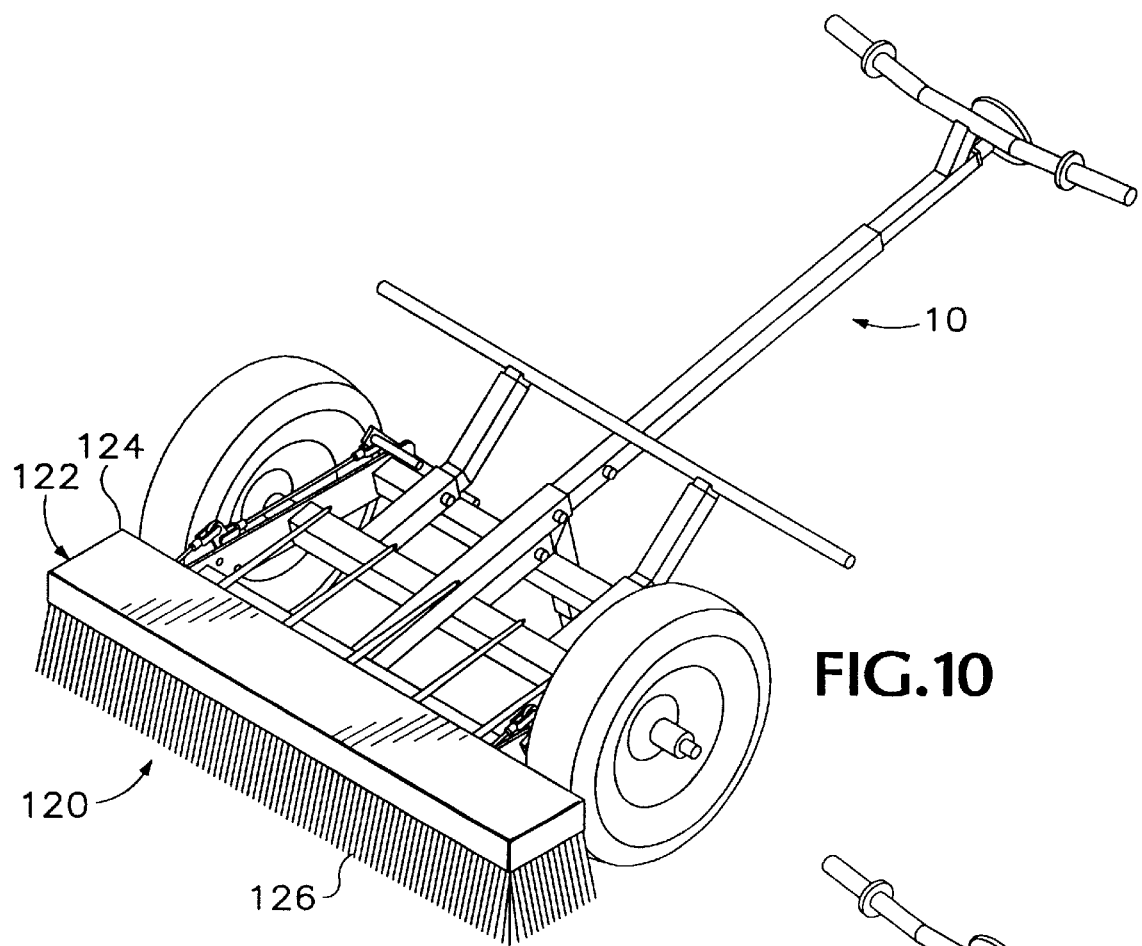
FIG. 10 is an isometric view similar to that of FIG. 1, but with a removable broom structure operatively coupled to the vehicle.

In FIG. 10, the attachment is a broom structure 122, the broom structure including an elongate head 124 which is mounted on the frame forward of the ground-travel-transport mechanism 14. The head carries a plurality of bristles 126 which descend downwardly from the head to engage the surface on which the vehicle rides.

Figure 11:
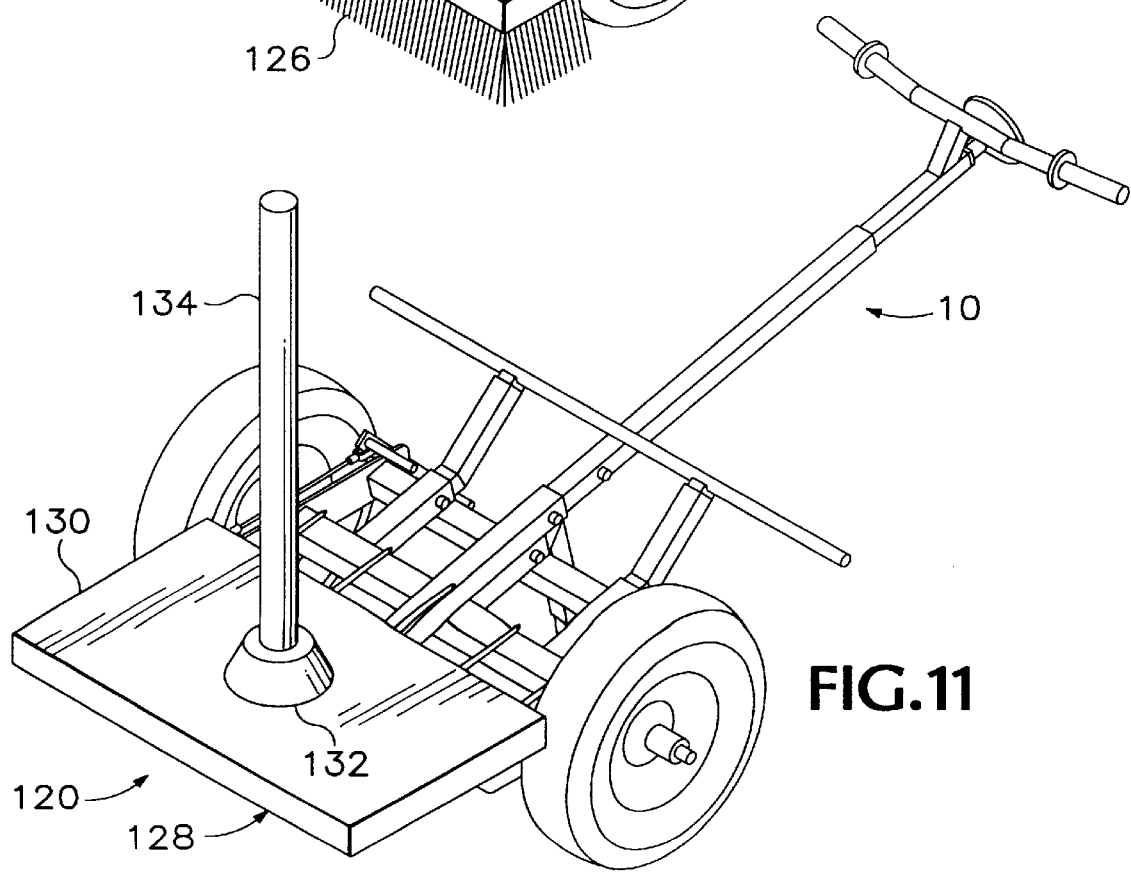
FIG. 11 is an isometric view similar to that of FIG. 1, but with a removable bobbin-supporting structure coupled to the vehicle.

In FIG. 11, the attachment takes the form of a bobbin-supporting structure 128. The bobbin-structure includes a base member 130 which is connected to the frame, and a raised central portion 132. An elongate mast 134 extends from the central portion of the bobbin-structure for receiving a bobbin or spool of material such as wire, cable or fencing. The mast extends generally perpendicular to the base member and may be of varying height, depending upon the size of the type of material to be transported.

Figure 12:
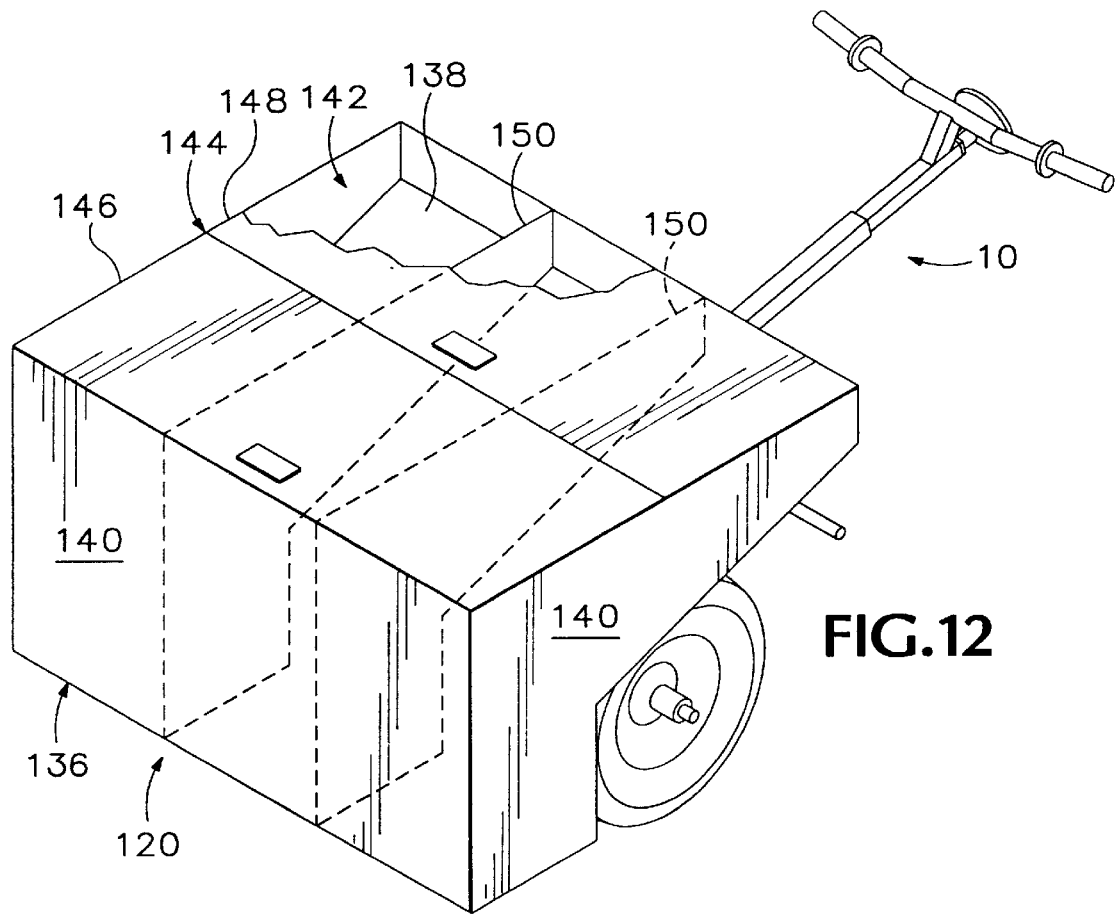
FIG. 12 is an isometric view similar to that of FIG. 1, but with a removable storage structure coupled to the vehicle.

In FIG. 12, the attachment takes the form of a storage structure 136. The storage structure includes a lower surface 138 which is connected to the frame 12, and parallel walls 140 which extend upwardly from the lower surface 138 to collectively define a storage area 142. In the depicted embodiment, the storage structure further includes a removable lid structure 144. The lid structure includes a first removable lid 146 and a second removable lid 148. The storage structure may also include partitions such as that shown at 150. The partition may be placed within the storage area which subdivides the storage area into separate compartments.

Figure 13:
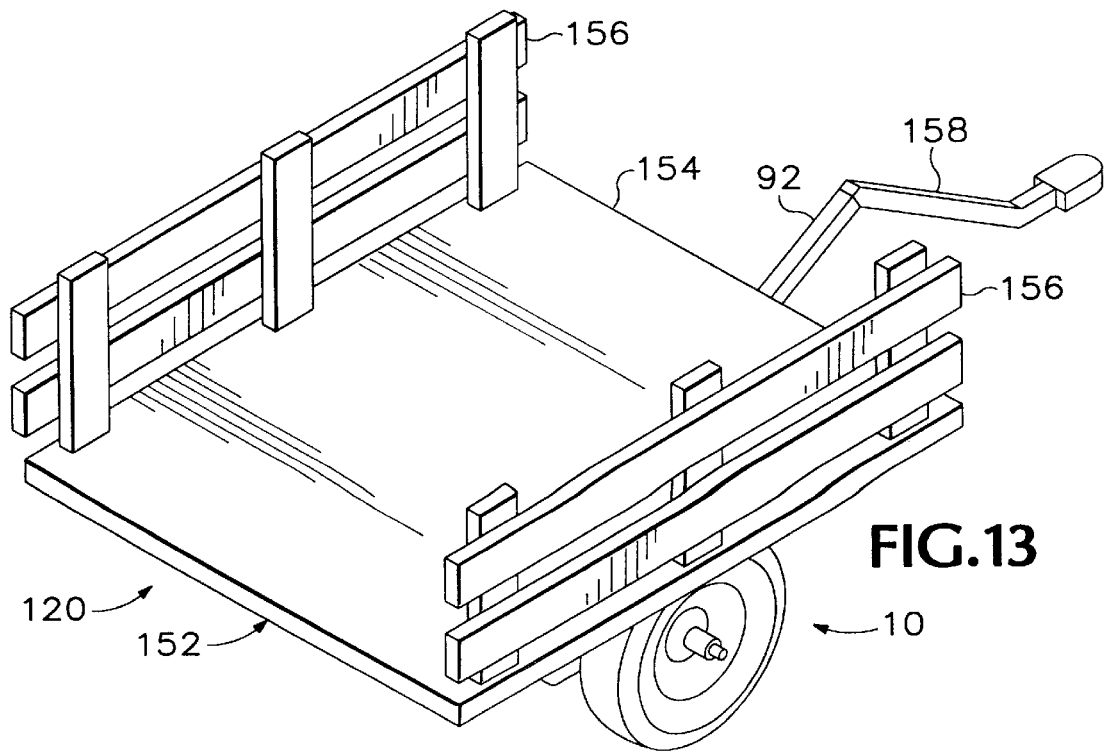
FIG. 13 is an isometric view similar to that of FIG. 1, but with a removable wagon structure coupled to the vehicle.

In FIG. 13, the attachment takes the form of a wagon structure 152. The wagon structure includes a rigid floor expanse 154 which is connected to the frame, and a pair of opposed side walls 156 which extend upwardly from the floor expanse. Furthermore the wagon structure may be provided with a hitch 158 to facilitate towing of the wagon by another vehicle. In an alternate embodiment, the attachment may take the form of a wheelbarrow structure.

While the foregoing invention has been shown and described with reference to the foregoing operational principles and preferred embodiments, it will be appreciated to those skilled in the art that other changes in form and detail may be made therein without departing from the spirit and scope of the invention as defined in the appended claims.

I claim:

1. An improved manual transport vehicle for transporting baled material over a surface, the vehicle having a frame, a ground-travel-transport mechanism and a handle, the improvement comprising:

plural elongate tines adapted to pierce and extend at least partially through baled material to be transported, wherein the tines are pivotally mounted on the frame about an axis extending generally parallel to the surface, and further wherein the tines are selectively pivotal within a span bounded by a lower orientation in which the tines extend generally forwardly from the frame, and an upper orientation in which the tines extend generally rearwardly from the frame.

2. The manual transport vehicle of claim 1, wherein the tines are selectively spaced along the frame.

3. The manual transport vehicle of claim 1, wherein the frame further includes a lever operatively coupled to the tines for adjusting the radial orientation of the tines with respect to the frame.

4. The manual transport vehicle of claim 1, wherein the upper orientation is defined where the tines rest against the frame.

5. The manual transport vehicle of claim 1, wherein the frame includes an adjustable stop which defines the lower orientation.

6. The manual transport vehicle of claim 1 which further comprises a rearward support structure mounted on the frame for supporting baled material rearward of the ground-travel-transport mechanism.

7. The manual transport vehicle of claim 6, wherein the rearward support structure includes an elongate member extending transverse to the frame.

8. The manual transport vehicle of claim 1, wherein the frame further includes an adjustable kickstand which extends generally downwardly from the frame to support the vehicle in a selected resting orientation.

9. The manual transport vehicle of claim 1, wherein the handle is telescoping, the handle including an outer concentric element, an inner concentric element having an oblique terminal portion at least partially extending within the outer concentric element, a block disposed within the outer concentric element adjacent the terminal portion of the inner concentric element, and a mechanism for drawing the block into slidable engagement with the terminal portion to effect a transverse displacement between the block and the terminal portion.

10. The manual transport vehicle of claim 1, wherein when the tines are in the upper orientation, the frame is configured to receive a selectively removable attachment which is supported on the frame for transporting objects.

11. The manual transport vehicle of claim 10, wherein the attachment includes a broom structure.

12. The manual transport vehicle of claim 10, wherein the attachment includes a wagon structure.

13. The manual transport vehicle of claim 10, wherein the attachment includes a bobbin-supporting structure.

14. An improved manual transport vehicle for transporting baled material over a surface, the vehicle having a frame, a ground-travel-transport mechanism and a handle, the improvement comprising:

plural elongate tines adapted to pierce and extend at least partially through baled material to be transported, wherein the tines are pivotally mounted on the frame about an axis extending generally parallel to the surface; and wherein the handle is telescoping, the handle including an outer concentric element, an inner concentric element having an oblique terminal portion at least partially extending within the outer concentric element, a block disposed within the outer concentric element adjacent the terminal portion of the inner concentric element, and a mechanism for drawing the block into slidable engagement with the terminal portion to effect a transverse displacement between the block and the terminal portion.

15. A manual transport vehicle for use in transporting baled material, the vehicle comprising:

a frame having an axle and a handle portion extending rearward of the axle, wherein the handle portion is telescoping and includes an outer concentric element, an inner concentric element having an oblique terminal portion at least partially extending within the outer concentric element, a block disposed within the outer concentric element adjacent the terminal portion of the inner concentric element, and a mechanism for drawing the block into slidable engagement with the terminal portion to effect a transverse displacement between the block and the terminal portion;

at least one wheel rotatably mounted on the axle; and plural elongate tines adapted to pierce and extend at least partially through the baled material to be transported, wherein the tines are pivotally mounted on the frame forward of the axle about an axis extending generally parallel to the axle.

* * * * *